March 31, 1959      F. F. McGINNIS      2,879,620
VACUUM OPERATED DEVICE FOR CATCHING INSECTS
Filed July 16, 1956
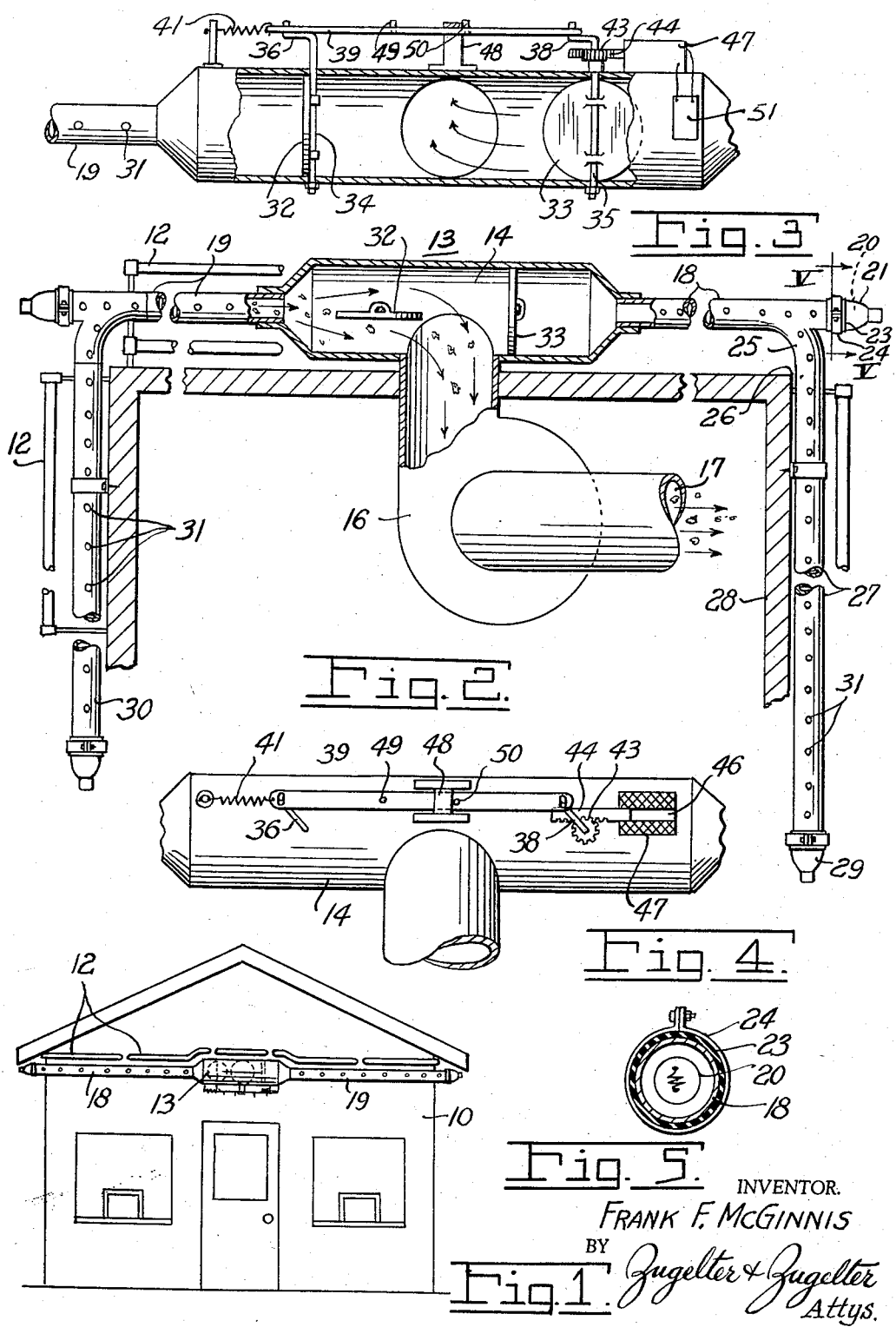
INVENTOR.
FRANK F. McGINNIS
BY Zugelter & Zugelter
Attys.

United States Patent Office 2,879,620
Patented Mar. 31, 1959

2,879,620

VACUUM OPERATED DEVICE FOR CATCHING INSECTS

Frank F. McGinnis, Newtown, Ohio

Application July 16, 1956, Serial No. 597,949

1 Claim. (Cl. 43—113)

This invention relates to a device for catching and disposing of insects.

An object of this invention is to provide a vacuum operated device which catches and collects insects and disposes of the collected insects.

A further object of this invention is to provide a device which may be mounted adjacent to lighting fixtures and which draws in and collects insects attracted to the lighting fixtures.

A further object of this invention is to provide a device of this type in which an elongated pipe or tube having a plurality of openings therein serves to collect the insects by action of a vacuum impressed on the interior of the pipe.

A further object of this invention is to provide such a device in which a suction is intermittently applied to the interior of the pipe to cause insects to be drawn into the pipe intermittently.

A further object of this invention is to provide a pipe of this type in which the interior of the pipe is lighted to attract the insects.

The above and other objects and features of this invention will be apparent to those skilled in this art from the following detailed description and the drawing, in which:

Figure 1 is a view in side elevation showing a building with an insect-catching device constructed in accordance with an embodiment of this invention, being attached to the building;

Fig. 2 is a somewhat schematic view partly in section and partly in bottom plan of the device and of the building;

Fig. 3 is a view partly in section and partly in side elevation showing details of construction of dampers which form a part of the device;

Fig. 4 is a fragmentary view in bottom plan showing details of the damper operating mechanism; and Fig. 5 is a view in section taken on the line V—V in Fig. 2.

In the following detailed description and the drawing, like reference characters indicate like parts.

In Fig. 1 is shown a building 10 which may be of the type used to dispense frozen desserts and the like. The building is provided with a row of fluorescent tube lights 12 which brightly illuminate the building. These lights tend to attract large numbers of insects, especially at night. Adjacent the lamps 12 is mounted an insect-catching device indicated generally at 13.

As shown in Fig. 2, the insect-catching device includes a central suction chamber 14 which is connected to a suction pump 16. The suction pump 16 discharges through a conduit 17 to an appropriate catch chamber (not shown). The suction chamber 14 is connected to lengths of tubing or pipes 18 and 19 which extend in opposite directions therefrom. At the remote end of pipe section 18 is mounted an electric light 20 which is directed along the interior of pipe 18. The light 20 is mounted inside a housing 21 having an open end adjacent pipe 18. A ring-shaped gasket 23 surrounds the open end of the housing and the end of pipe 18. A split ring clamp 24 holds the gasket 23 in air-sealing relationship with the end of the pipe 18 and with the housing 21. The housing 21 may be shaped as a reflecting mirror to project the light along the pipe. A T 25 is formed in the pipe 18 adjacent one corner 26 of the building and connects the pipe 18 with a further length of pipe 27 which extends along one side wall 28 of the building. An electric light 29 projects light into the pipe 27. A similar length of pipe 30 is connected to the pipe 19 and will not be described in detail here. The pipes 18, 19 and 27 are each provided with a plurality of openings 31 through which insects are drawn into the pipes. Each of the openings 31 may be approximately one-fourth inch in diameter. The openings are shown circular in form, but, if desired, the openings may be in the form of slots. The openings are of sufficient size to permit passage of small insects, such as mosquitoes, gnats, and the like. The openings may be arranged, as shown, in rows on the top, bottom, and sides of the pipes.

The interiors of the pipes are painted a light color, such as white, so that the light inside the pipes illuminates the openings 31 to attract the insects. The pipes are mounted adjacent and parallel to the fluorescent lamps 12, and the insects are attracted by the fluorescent lamps to the vicinity of the pipes 18, 19, 27, and 28; then, when suction is applied to the pipes, the insects are drawn into the openings 31 to be discharged through the discharge conduit 17.

An intermittent suction effect is provided by means of dampers 32 and 33 which are mounted inside the suction chamber 14. The damper 32 is mounted on a shaft 34 and the damper 33 is mounted on a shaft 35. The upper ends of shafts 34 and 35 carry cranks 36 and 38, respectively. As shown most clearly in Fig. 4, the cranks 36 and 38 are linked together by a link 39 which is so arranged that when one of the dampers is open, the other damper is closed. A spring 41 urges the link 39 to the position shown in Figs. 3 and 4 in which damper 32 is closed and damper 33 is open. A gear 43 is mounted on shaft 35. The gear 43 meshes with a rack 44. The rack 44 is mounted on the core 46 of a solenoid 47. When the solenoid 47 is energized, the link 39 is advanced to the right as shown in Figs. 3 and 4 to turn the dampers to the position shown in Fig. 2 in which damper 32 is open and damper 33 is closed. The link 39 reciprocates in a guide 48 which is mounted below the suction chamber 14. Pins 49 and 50 mounted in the link 39 can engage the guide 48 to limit movement of the dampers.

The solenoid 47 is connected to an appropriate electrical timing device 51 which is connected to an appropriate source of electric power (not shown). The timing device 51 may be arranged to cause the solenoid to be energized for a period of one minute, following which the solenoid is de-energized for a period of one minute and then energized again. This results in periodic suction pulses of one minute's duration in each of the pipes, each pulse being followed by a one minute period in which the suction is released. I have found that best results are obtained when such periodic suction is applied. However, the length of time of the pulses may be varied.

The insect-catching device illustrated in the drawing and described above is subject to structural modification without departing from the spirit and scope of the appended claim.

Having described my invention, what I claim as new, and desire to secure by Letters Patent is:

A device for catching insects which comprises an elongated substantially straight length of hollow pipe having a plurality of openings in the wall thereof the interior of the wall being of a light color, a lamp holder completely closing an end of said pipe, and light means in the holder projecting light into the interior of said pipe for attracting insects thereto, means for attaching the lamp holder to said end of the pipe in substantially air-sealing relation thereto, a lamp in said lamp holder projecting light along the pipe to illuminate the interior of the wall and the openings to attract the insects to the openings, a suction chamber connected to the other end of the pipe, means for impressing a vacuum on the suction chamber, a damper in the suction chamber for controlling the vacuum in the pipe, and means for periodically opening and closing the damper to impress periodic suction pulses on the interior of the pipe to draw the insects into the pipe to be discharged into the suction chamber, the suction in the pipe being periodically released on closing of the damper.

References Cited in the file of this patent

UNITED STATES PATENTS

| | | |
|---|---|---|
| 959,155 | Nault | May 24, 1910 |
| 1,484,703 | Eshman | Feb. 26, 1924 |
| 2,091,221 | Switzer | Aug. 24, 1937 |
| 2,569,722 | Knox | Oct. 2, 1951 |
| 2,807,116 | Finley | Sept. 24, 1957 |

FOREIGN PATENTS

| | | |
|---|---|---|
| 510,874 | Belgium | May 15, 1952 |